July 14, 1959 E. A. HERIDER ET AL 2,894,566
SEAT STRUCTURE
Filed Sept. 19, 1955 3 Sheets-Sheet 1

INVENTORS:
ELMER A. HERIDER
KENNARD PITTS
BY
Webb, Mackey & Burden
THEIR ATTORNEYS

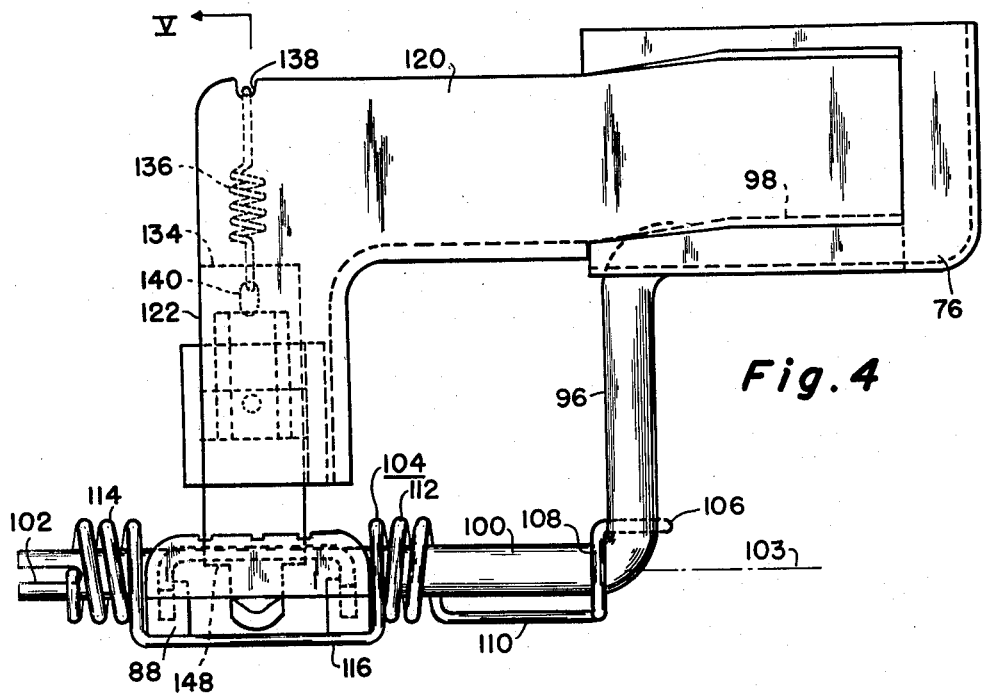
Fig. 4
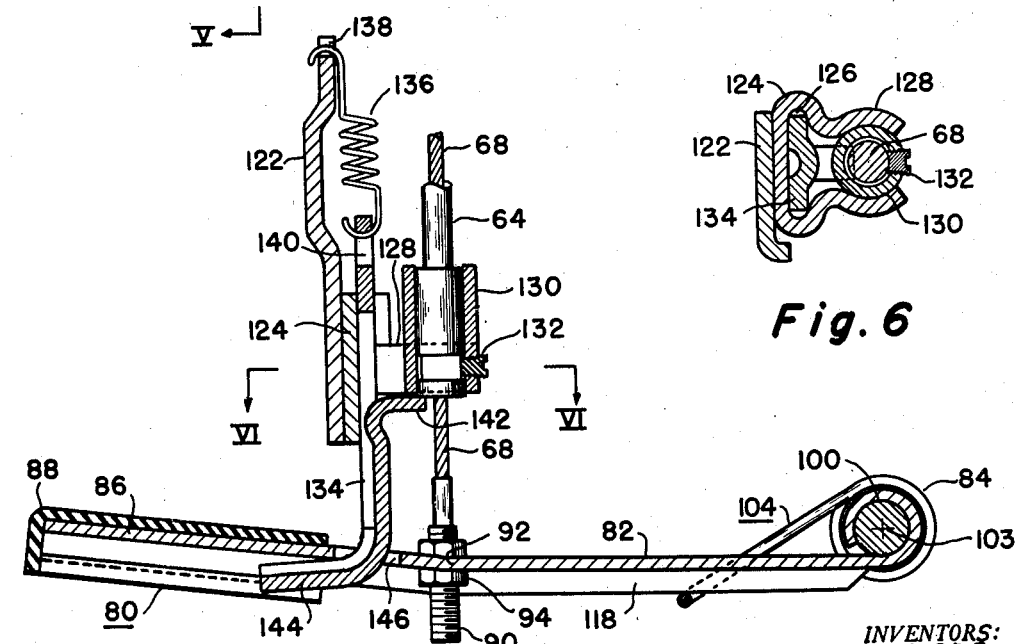
Fig. 5
Fig. 6
INVENTORS:
ELMER A. HERIDER
KENNARD PITTS
BY Webb, Mackey & Burden
THEIR ATTORNEYS

United States Patent Office 2,894,566
Patented July 14, 1959

2,894,566

SEAT STRUCTURE

Elmer A. Herider, Dearborn Township, Wayne County, and Kennard Pitts, East Detroit, Mich., assignors to Rockwell-Standard Corporation, a corporation of Pennsylvania Application September 19, 1955, Serial No. 534,972

11 Claims. (Cl. 155—163)

This invention relates to an adjustable seat structure and releasable locking means therefor, and more particularly, relates to a remote cable release mechanism for controlling a locking device which adjustably locks a back rest in adjusted positions relative to a seat frame included in the seat structure.

In conventional two-door automobile bodies in which passengers are seated both in the front and in the rear of the passenger compartment, the front seats ordinarily have folding back rests permitting them to be folded out of the way for convenience of the rear passengers in order to clear a path for themselves from the doors to the rear of the passenger compartment. Ordinarily, the folding back rest is not adjustable, even though adjustability is a great asset in the matter of comfort and convenience for the posture of the front seat passengers. Accordingly, the presence of an adjustable locking device for use in conjunction with the folding back rest is greatly to be desired, it being of prime importance, however, that the locking device be suitably controlled for adjustment through a cable release mechanism, for instance, so as to permit the seat occupant readily to change the adjustment.

An object of the present invention is to provide a readily operated remote cable release mechanism for operating an adjustable folding back rest, such mechanism being arranged in a convenient disposition for operation by the occupant of the seat and having utility in the instance of front seats for the two-door automobile bodies referred to and in other instances as well.

It is a further object to provide, in a two-door automotive passenger vehicle having a front seat, a dual cable release mechanism for the front seat back rest wherein one release mechanism is accessible to the front seat occupant and wherein another and similar mechanism is accessible to passengers to the rear of the front seat so as to permit the rear passengers to release and fold the back rest out of their way in gaining access to or from the doors of the vehicle.

Further features, objects, and advantages will either be specifically pointed out or become apparent when, for a better understanding of the invention, reference is made to the following description taken in conjunction with the drawings generally described as follows:

Figure 4 is a front elevational view in the direction of the arrows IV—IV of Figure 3;

Figure 5 is a side elevational section view corresponding to Figure 3 but taken along the section lines V—V of Figure 4; and Figure 6 is a transverse section view taken along the section lines VI—VI of Figure 5.

Figure 1:
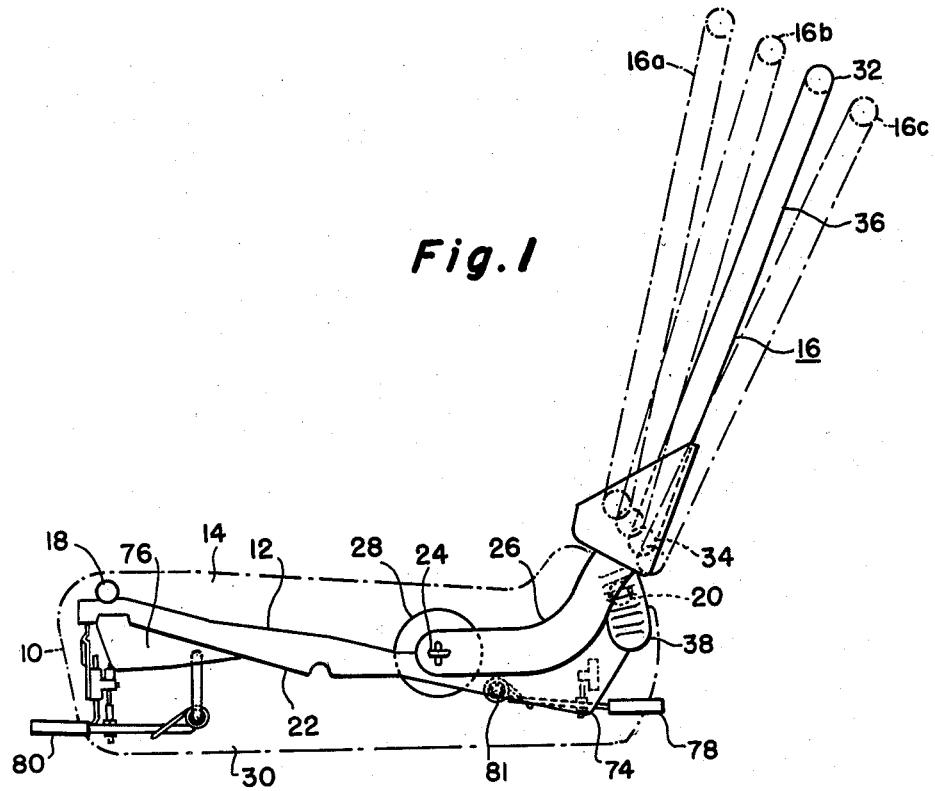
Figure 1 is a side elevational view of a seat and adjustable back rest structure having a locking device therefor under the control of dual cable release means.
Figure 2:
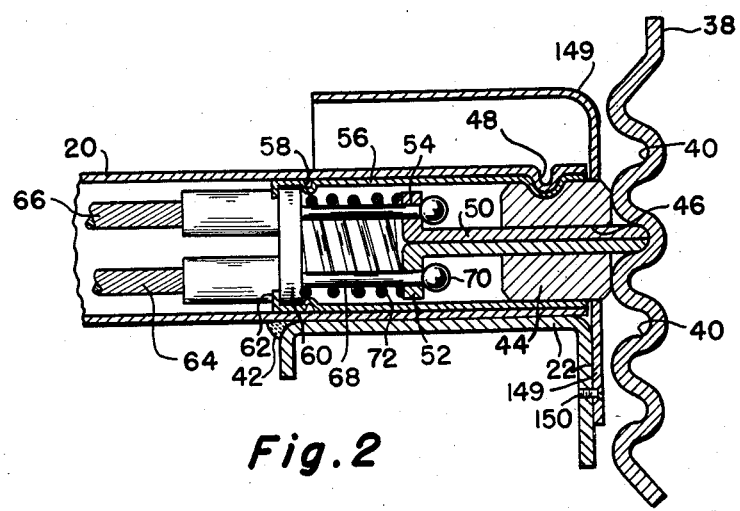
Figure 2 is a longitudinal section through the locking device.
Figure 3:
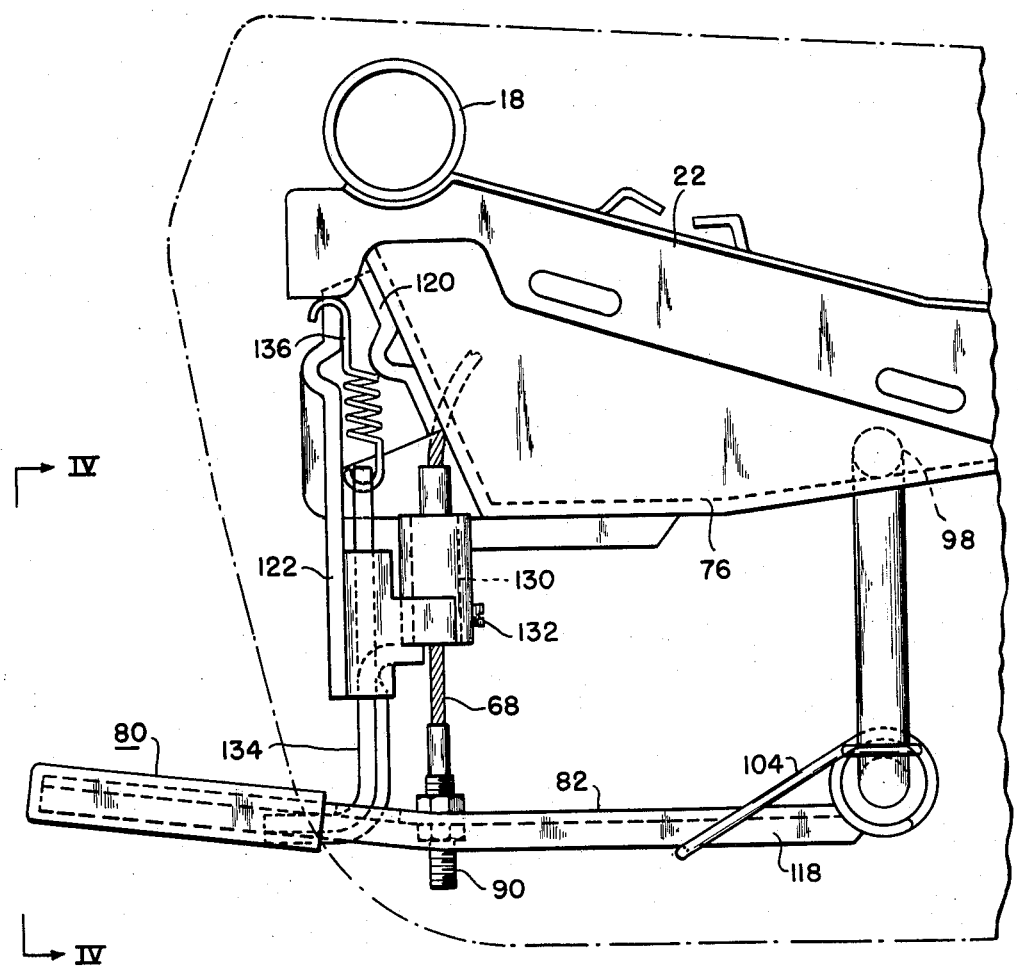
Figure 3 is a side elevational view showing a fragmentary enlargement of the front cable release means of Figure 1.

In more particular reference to Figures 1 and 2 of the drawings, a seat support framework 10 is shown having a generally rectangular seat frame 12 for supporting a full width seat cushion 14 and having a split back rest structure, one portion of which comprises a generally rectangular folding back rest 16 which is adjustably located in positions relative to the seat frame 12. The seat frame 12 includes a hollow full length front rail 18 and a hollow rear rail 20 connected together by means of a pair of longitudinally extending spaced apart side rails which may be formed from metal stampings, and one of which is particularly shown at 22. Intermediate the opposite ends of the illustrated near side rail stamping 22, a pivot member 24 is provided adapted to rotate about its own axis and having a noncircular end portion received within and keyed to a slot formed in an L-shaped arm 26. A spiral leaf spring 28, anchored at its outer end to the side rail 22, surrounds the pivot member 24 and has its free inner end secured to the pivot member in a manner to urge the pivot and arm 26 to swing counterclockwise about the pivot member as a center as viewed in Figure 1.

The rectangular seat frame 12 is secured at its lateral sides to a pair of spaced apart side frames 30 adapted to be slidably mounted to appropriate fixed tracks carried, for instance, by means of the floor pan of an automotive vehicle, not shown. The rectangular back rest 16 includes a pair of vertically spaced apart upper and lower bars 32, 34 which are connected together at their opposite ends by means of a pair of parallel, generally vertically extending bars, one of which is shown at 36. The vertical bar 36 is rigidly affixed to the free end of the L-shaped swinging arm 26 so as to permit swinging movement of the back rest about the axis of the pivot member 24 as a center. An additional pivot is provided on the opposite side of the back rest 16, which is located adjacent the transverse midplane of the full width seat cushion 14 and is so arranged to cooperate with the pivot member 24 to permit the back rest to swing forwardly and also slightly toward one side under the action of the spiral leaf spring 28. A plate 38 arranged generally in the form of a segment of a circle about the pivot member 24 as a center, is provided with a plurality of transverse corrugations in the surface thereof defining a plurality of relatively deep pockets 40 and is rigidly affixed to the back rest structure 16 either at or adjacent the juncture between the L-shaped swinging arm 26 and the vertical arm 36 of the back rest structure.

At the corner of the seat frame 12 formed by the juncture between the near side rail 22 and the rear rail 20 which are welded together at 42, a cylindrical metal plug 44 is provided having a long and wide, but relatively shallow, slot 46 formed in a longitudinal disposition therein and adapted to register with the respective pockets 40 which are on the inner or medial face of the corrugated plate 38. The plug 44 has a shallow external socket 48 in the periphery thereof and within the slot 46, the plug slidably receives a pair of metal strips which are welded together back to back to form a plunger 50. Each of the strips is of L-shaped having a short transverse leg 52 provided with a Bowden cable anchoring opening 54. The rear side rail 20 receives a slevee 56 which at one end receives the plug 44 and which at the other end has an inwardly deflected circumferential embossment 58 adapted to engage one side of a Bowden cable terminal disc 60. The opposie side of the Bowden cable anchoring disc 60 is engaged by a flange 62 formed on the end of the sleeve 56 and cooperating with the embossment 58 to trap the anchoring disc 60 against longitudinal displacement in the sleeve 56 and in the rear rail 20. The walls of the rear rail 20 and of the sleeve 56 are locally punched into the socket 48 in the plug 44 so as to stake the parts together and prevent longitudinally shift of the plug and the sleeve within the rear rail 20.

At spaced apart points in the anchoring disc 60, a pair of front pedal controlled and rear pedal controlled Bowden cables 64, 66 is suitably anchored, each having a pull wire element 68 slidably received therein and passing through the apertures in the different short transverse legs 52 of the plunger 50. A stopper 70 in the shape of a spherical ball clamped to the end of the pull wire prevents withdrawal of each pull wire 68 from the aperture in the short transverse leg 52. A common helical coil 72 surrounds the pull wires 68 in the space between the anchoring disc 60 and the short transverse leg flanges 52 of the plunger so as to tend to urge the plunger 50 forwardly into the pockets 40 which register with the plunger slot 46 and, at the same time, to tend to keep the pull wires 68 fully retracted in the Bowden cables 64, 66.

Actuation of either of the Bowden cables 64, 66 in the manner hereinafter described causes the plunger 50 to retract from the pocket 40 within which it is received and thereby permits an occupant of the seat 10 to adjust the angularity of the back rest 16. The positions of adjustment not only include a normal adjustment position shown by solid lines 16 in Figure 1, but also a plurality of higher and lower adjustments indicated in dotted line positions by the respective dotted line showings 16a, 16b, and 16c to the front and to the rear respectively of the normal position.

The near side rail 22 is formed with an integral triangular body portion 74, Figure 1, at the rear thereof having side walls and an open lower wall and having an open wall at the rear. At the forward end of the near side rail 22, a triangular body 76 in the form of a folded sheet metal bracket is welded to the side rail 22 and provides a forwardly and upwardly extending front wall portion and a bottom wall portion which is deflected upwardly in the rear.

A pair of pedal control cable release mechanisms 78, 80 is suitably secured to the rear triangular body portion 74 and to the front triangular body 76 respectively. These cable release mechanisms are substantially identical to one another, except for the immediately following three details. The rear cable release mechanism 78 is pivotally connected to swing about a bar 81 which is located between and supported by means of the side walls of the triangular body portion 74, the rear mechanism 78 operates the rear cable release 66, Figure 2, and the rear cable release mechanism 78 is provided primarily for use by a passenger or occupant disposed not in the seat structure 10, but occupying a seat to the rear thereof. On the other hand, the front cable release mechanism 80 is provided for the use and control of the occupant of the seat structure 10. It is located at a lower level than the triangular body 76 from which it is supported and operates the front release cable 64, Figure 2. In the interests of brevity, the dual cable release mechanisms 78 and 80 will be described only in terms and illustration of the latter mechanism to which the former mechanism is identical, except in the details just noted.

In Figures 3, 4, 5, and 6, the front release mechanism 80 includes a stamped sheet metal pedal element 82 having a looped rear portion 84 and a forwardly extending free front portion 86 over which a suitable sleeve cushion pad or rubber boot 88 may be provided. The front Bowden wire control cable 64 has the slide wire element 68 thereof provided at its extremity with a threaded stud portion 90 which passes through an opening 92 formed in the midportion of the pedal plate 82. A pair of nuts 94 threadably received on the stud portion 90 on the opposite top and bottom sides of the pedal plate 82 secure the wire 68 in an adjustable but positively anchored position to the pedal plate 82.

A Z-shaped pedal pivot bar 96 is provided which has a vertically extending midportion and a pair of horizontal upper and lower leg portions 98, 100. The upper leg portion 98 is welded or otherwise rigidly secured to the upper surface of the upwardly deflected rear part of the lower wall portion of the sheet metal body bracket 76 secured to the front of the near seat side rail 22, Figures 1 and 3. With respect to the relative position of the vertical midportion of the Z-shaped bar 96, the upper leg 98 extends horizontally and outwardly toward its point of securement to the bracket body 76 in the front corner of the seat frame 12. The lower leg portion 100 extends in the opposite horizontal direction from the upper leg portion 98 but at a lower level and terminates at a position spaced apart from the corner of the seat frame 12. At its just named point of termination, the leg portion 100 has a longitudinally extending slot 102 formed therein in its end. The looped portion 84 of the pedal plate 82 is received about the horizontally extending lower leg 100 of the Z-shaped bar which, accordingly, defines a swing axis at 103 for the pedal plate 82.

A generally helical type one-piece coil return spring structure 104 is received on the horizontally extending lower leg 100 in a manner to straddle the looped portion 84 of the pedal plate and, in assembly, the pedal plate and the spring 104 are introduced and slid upon the lower leg 100 together. The return spring 104 includes a semicircular anchoring portion 106 which extends halfway about the base of the vertical portion of the Z-shaped bar 96. Another half circular portion 108 joined to the first portion 106 extends halfway about the lower leg portion 100, but entwines in an opposite direction from the anchoring portion 106. The half circular portion 108 is joined by means of a longitudinally extending straight wire portion 110 to a coil spring portion consisting of two and one-half loops or coils at 112. The coils 112 are disposed at one side of the rear end of the pedal plate 82 and a companion set of coils consisting of two and three-fourths loops at 114 is provided at the opposite side of the pedal plate 82.

The coils 114 have a straight anchoring portion suitably received transversely of the longitudinal slot 102 in the lower Z-bar leg 100. The two sets of coils 112, 114 which straddle the pedal plate 82 are interconnected by means of an integral U-shaped portion of the spring 104, of which the parallel opposite legs are secured to the coil sets 112, 114 and the base portion 116 thereof is looped about the pedal plate 82 so as to engage a pair of opposite longitudinal stiffening flanges 118 thereof at a point spaced apart from the axis 103 and in a manner to urge the pedal plate 82 upwardly or clockwise as viewed in Figures 3 and 5.

The triangular body 76, Figure 4, has an L-shaped bracket 120 welded thereto in a disposition such that one leg of the bracket 120 extends horizontally and the other or shorter leg thereof at 122 is arranged in depending relationship. The depending leg 122 is provided at its lower end portion with a vertically disposed substantially C-shaped guide 124 welded or otherwise secured thereto. The C-shaped guide 124 defines a vertically extending tunnel 126 and is provided adjacent the open side of the tunnel with a pair of integral sheet metal arms 128 which extend laterally of the C-shaped guide 124 in a direction away from the location of the depending leg 122. The integral arms 128 on the C-shaped guide 124 receive a short vertically disposed anchoring tube 130 which is welded or otherwise secured thereto and is provided with an opening in the side thereof for a Bowden cable anchoring screw 132. The Bowden cable 64 operated by the front pedal mechanism 80 is received within the stationary anchoring tube 130 and is positively secured therein by means of the anchoring screw 132 which seats in and engages an annular groove formed in the end of the Bowden cable 64.

A generally L-shaped pedal guide plate 134 is slidably received within the C-shaped guide 124 for vertical travel therein so as to guide the pedal plate 82 in up and down travel. A guide plate return spring 136 is anchored at its upper end to the depending leg 122 of the L-bracket 120 in a notch 138 there provided and, at its lower end, is secured to the margin of an upper end opening 140 in the plate 134 so as to support the latter. The plate 134 intermediate its ends has a transverse shoulder forming lug or tab 142 sheared and deflected out of the surface thereof which is adapted in the uppermost position of the plate 134 to engage either the anchored end of the Bowden cable 64 or the supporting anchoring tube 130 therefor. At the depending lower end of the L-shaped plate, a bent foot portion 144 is provided which may have a longitudinally extending embossment therein for rigidifying the same. The foot portion 144 extends through an opening 146 formed in the pedal plate 82 adjacent the pull wire anchoring opening 92.

Adjacent the juncture between the foot portion 144 and the main body portion of the slide plate 134, a pair of transverse shoulders or lugs 148 is provided which engage the upper surface of the pedal plate 82 adjacent the margins of the opening 146. Upward movement of the pedal plate 82 under the urgings of the return spring 104 is limited owing to the abutting action between the shoulders 148 and the plate 82 at one end of the plate 134 and owing to the engagement between the shoulder 142 and the cable anchoring structure adjacent the midportion of the plate 134. A trim cover plate 149, Figure 2, has a vertically disposed attaching flange which is screwed at 150 to the side rail 22 and further has a trim-concealing horizontal flange joined to the attaching flange and extending upwardly and inwardly for concealing the side edge of the seat trim, not shown.

Operation of both the dual cable releases 78, 80 of Figure 1 can be understood from an examination of only the front pedal 80 of Figure 5. The heel of the operator occupying the seat or else the toe of the operator from the rear of another seat will engage and depress the rubber cushion 88 at the forward end of the pedal plate 82 and tend to swing the pedal plate downwardly in a counterclockwise direction about the swing axis 103. The forward portion of the pedal plate 82 extends laterally from beneath the seat structure 10 so as to make the pedal cushion 88 accessible to such operation by the operator.

Against the action of the slide wire return spring 72, Figure 2, and against the action of the slide plate return spring 136, Figure 5, the pedal plate 82 carries downwardly and moves therewith the slide wire element 68 in the Bowden cable 64 and also the slide plate 134 whose bent foot 144 is engaged with the margin of the opening 146 in the pedal plate 82. Inasmuch as the slide plate 134 is constrained in the C-shaped guide 124 to vertical travel only, the foot 144 is appropriately provided with a curved crotch portion engaging the edge of the opening 146 and providing for limited relative movement between the foot portion 144 and the arcuately swinging pedal plate 82. Downward travel of the slide plate is arrested when the lower portion of the slide plate return spring 136 engages the upper edge of the C-shaped guide 124. At this point of engagement, however, the slide wire element 68 is in a position sufficiently low enough to have caused the plunger 46, Figure 2, to have been withdrawn from any pocket 40 within which it was received. Thereafter, the back rest structure 16 can be swung by the operator into any of the positions 16, 16a, 16b, 16c of Figure 1 and the pedal 82 is then released so as to permit the spring biased plunger 46 to advance into reception into whatever pocket 40 then registers therewith. The seat back rest 16 is therefore positively locked and located in a newly assumed position.

Due to the offset provided by the vertical portion of the Z-bar 96, the pedal plate 82 is adapted to be located at a point considerably below the general level of the seat fram and at its base adjacent the supporting surface on which the seat structure is placed. This location is advantageous in that, even though the pedal front portion 86 and the cushion 88 extend laterally toward the front of the seat structure, the pedal presents no obstacle to the calf of the leg of the occupant of the seat and is otherwise close to the floor and out of the way from interfering with the normal foot and leg motion of the occupant. Accordingly, a fairly rigid pedal framework can be employed and, toward this end, the rear or looped end portion 84 of the pedal has the one-piece return spring 104 cooperating therewith which serves the added function of straddling the pedal to prevent its lateral shift along the lower leg portion 100 of the Z-bar. Intermediate its opposite ends, the pedal plate 82 is constrained and guided to motion in a vertical plane only, owing to the engagement therewith of the foot 144 of the slide plate which is capable of only limited relative movement with respect thereto, all confined to a vertical plane.

Variations within the spirit and scope of the invention described are equally comprehended by the foregoing description.

We claim:

1. In a seat support construction including a seat frame, a back rest mounted thereto, and a locking device having a normally advanced plunger for locking the back rest in adjusted positions, the improvement comprising actuator pedal means of a construction which by means of first and second fixed support members is adapted to be operatively mounted on a supporting structure, said pedal means including a plunger release cable, a horizontally disposed pedal connected to the release cable at a first portion of the pedal intermediate its opposite ends, a first Z-bar support member fixed with one end in depending relation and supporting one of the ends of the pedal thereat to provide for swinging movement of the latter laterally and vertically spaced therebelow, a second guide support member fixed in depending relation at a location laterally spaced from the Z-bar member, and a vertically disposed element slidably related to the guide member and connected to a second portion of the pedal to guide the same to conform to a generally vertical path of travel, said first and second portions of the pedal being located in closely spaced proximity to one another.

2. In a seat support construction including a seat frame, a back rest mounted thereto, and a locking device having a normally advanced plunger locking the back rest in adjusted positions, the improvement comprising actuator pedal means of a construction which by means of first and second fixed support members is adapted to be operatively mounted on a supporting structure, said pedal means including a plunger release cable, a horizontally disposed pedal connected to the release cable at a portion of the pedal intermediate its opposite ends, a first support member fixed with one end in depending relation and supporting one of the ends of the pedal thereat for swinging movement of the latter in a position laterally and vertically offset therebelow, a second guide support member fixed in depending relation at a location laterally spaced from the first member, and a vertical element slidably related to the guide member and connected to an intermediate portion of the pedal to guide the same in a generally vertical path of travel, said vertical element having spaced transverse shoulder portions engageable respectively with a structure carried by the guide member and with the pedal to limit upward vertical travel of the latter.

3. In a seat support construction including a seat frame and a back rest mounted thereto adjustable to various locked positions, the improvement comprising actuator pedal means of a construction which by means of first and second fixed support members is adapted to be operatively mounted on a supporting structure, said pedal means including a plunger release cable, a horizontally disposed operating element connected to the release cable at a portion of the operating element intermediate its opposite ends, said operating element having a looped end extending laterally therefrom, a first support member fixed with one end in depending relation and having a rod portion thereat passing through the loop of the looped end of said operating element and supporting the latter for swinging movement in a vertical plane, a return spring device for the operating element having spaced portions concentric with the rod portion and straddling the looped end of the operating member to restrain the end against lateral shift, a second guide support member fixed in depending relation at a location laterally spaced from the first member, and a vertically disposed element slidably related to the guide member and connected to a portion on the operating element to guide the same in a generally vertical path of travel.

4. In a seat support construction including a seat frame and a back rest mounted thereto adjustable to various locked positions, the improvement comprising actuator pedal means of a construction which by means of first and second fixed support members is adapted to be operatively mounted on a supporting structure, said pedal means including a plunger release cable, a horizontally disposed operating element connected to the release cable at a point on the operating element intermediate its opposite ends, said operating element having a looped end extending laterally therefrom a first Z-bar support member fixed with one end in depending relation and having a lower leg portion passing through the loop of the looped end of said operating element and supporting the latter in downwardly offset relationship for swinging movement in a vertical plane, a return spring device for the operating element having spaced apart coil portions on the lower leg portion of the Z-bar member and straddling the looped end of the operating member to restrain the end against lateral shift, a second guide support member fixed in depending relation at a location laterally spaced from the Z-bar member, and means slidably related to the guide member and connected to a portion of the operating element to guide the same in a generally vertical path of travel.

5. In a seat support construction including a seat frame, a back rest mounted thereto and adjustable and having plunger locked adjusted positions, the improvement comprising actuator pedal means of a construction which by means of first and second fixed support members is adapted to be operatively mounted on a supporting structure, said pedal means including a plunger release cable, a horizontally disposed operating element connected to the release cable at a portion on the operating element intermediate its opposite ends, said operating element having a looped end extending in a direction laterally therefrom, a member fixed with one end in depending relation and having a rod portion thereat passing through the loop of the looped end of said operating element and supporting the latter for swinging movement in a vertical plane, a return spring device for the operating element having spaced apart coil portions concentric with the rod portion and straddling the looped end of the operating element to restrain the end against lateral shift, and second fixed support means arranged with a part operatively connected to an intermediate portion on the operating element to guide the same in a generally vertical path of travel.

6. For use with adjustable seat structure, the improved combination comprising a control element therefor, fixed means adapted to be mounted on a supporting seat structure portion and forming a joint pivoting said element at one end thereupon, a slide carried for limited shifting movement and operatively movable in concert with said control element to limit the pivoting movement of the control element and connected thereto to guide the same throughout such limited movement, and a return spring providing a continuous bias on the slide in the direction of said seat structure portion.

7. For use with adjustable seat structure, the improved combination comprising a control element, a slide wire actuator connected thereto for attachment to a remote point, means adapted to be mounted on a supporting structure and forming a joint for pivoting said element at one end thereupon, a shiftably mounted slide for limited shifting movement and operatively movable in concert with said control element at a point adjacent the control element when in its unpivoted position and connected thereto for coordinated movement to guide and limit pivoting of the same as it operatively controls the slide wire, and a return spring connected to said slide constantly biasing said control element towards its unpivoted position.

8. For use with relatively remote and proximal actuators, dual pull wire mechanism for adjustment of locked parts comprising in combination with supporting structure a locking plunger shiftably mounted thereto and having a common base portion for attachment to the adjacent end of separate ones of the pull wires adapted to receive force from a number of the actuators, there being a like number of force transmitting pull wires of which each presents a distal end for attachment to a different actuator for dual control operation of said locking plunger by forces exerted through either or both wires pulling in concert.

9. Dual pull wire mechanism according to claim 8 and further comprising stoppers individual to said wires at point of attachment of their adjacent end aforesaid to the common base and a common return spring about a portion of each wire and biasing the base portion of said plunger to an advanced locking position.

10. In combination with supporting means, a vertically disposed guide track affixed thereto, a pedal-guiding slide therein having vertically spaced lateral projections, means biasing said slide upwardly for engaging one of said projections with a stop, a wire connected pedal articulately joined at one end to said supporting means for vertical swinging movement on a fixed axis and having a midportion connected for guiding movement to the other lateral projection on said slide, and means incorporated at said joint to counter the weight of the pedal by biasing said pedal upwardly in the direction of bias of said slide.

11. In combination with supporting means, a pedal element, means to guide the pedal element shifably mounted for movement therewith, means forming a joint mounting the heel end of said pedal element to said supporting means for vertical swinging movement about a fixed axis, said guide means being connected to an engageable swinging portion of said pedal element at an outer point removed from said fixed swing axis, a transmission mechanism connected at a point to said engageable swinging portion of said pedal element, said element having an extension beyond the outer point of connection thereof, and a boot on said extension.

References Cited in the file of this patent

UNITED STATES PATENTS

| 629,381 | Lovering | July 25, 1899 |
| 782,996 | Swigart | Feb. 21, 1905 |
| 919,084 | Springer | Apr. 20, 1909 |
| 1,228,934 | Leo | June 5, 1917 |
| 1,660,456 | Routledge | Feb. 28, 1928 |
| 1,753,513 | Hansen | Apr. 8, 1930 |
| 1,765,071 | Haselkus | June 17, 1930 |
| 2,118,689 | Whedon et al. | May 24, 1938 |
| 2,384,805 | Arens | Sept. 18, 1945 |
| 2,619,846 | Wales | Dec. 2, 1952 |

FOREIGN PATENTS

| 95,857 | Switzerland | May 30, 1939 |
| 410,378 | France | Mar. 12, 1910 |